(12) United States Patent
Hazzani

(10) Patent No.: US 9,767,279 B2
(45) Date of Patent: Sep. 19, 2017

(54) SYSTEMS AND METHODS FOR COMBINED PHYSICAL AND CYBER DATA SECURITY

(71) Applicant: Verint Systems Ltd., Herzelia, Pituach (IL)

(72) Inventor: Gideon Hazzani, Rishon Le Zion (IL)

(73) Assignee: Verint Systems Ltd., Herzliya, Pituach (IL)

( * ) Notice: Subject to any disclaimer, the term of this patent is extended or adjusted under 35 U.S.C. 154(b) by 549 days.

(21) Appl. No.: 13/868,220

(22) Filed: Apr. 23, 2013

(65) Prior Publication Data

US 2013/0347060 A1 Dec. 26, 2013

(30) Foreign Application Priority Data

Apr. 23, 2012 (IL) .......................................... 219361

(51) Int. Cl.
*G06F 11/00* (2006.01)
*G06F 21/55* (2013.01)

(52) U.S. Cl.
CPC ................... *G06F 21/554* (2013.01)

(58) Field of Classification Search
CPC .............................. H04L 63/20; H04L 63/102
USPC ........................................................ 726/1, 25
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 2005/0099288 A1 | 5/2005 | Spitz et al. | |
| 2007/0150934 A1* | 6/2007 | Fiszman et al. | 726/1 |
| 2008/0014873 A1 | 1/2008 | Krayer et al. | |
| 2008/0077752 A1* | 3/2008 | Kinoshita | 711/154 |

(Continued)

FOREIGN PATENT DOCUMENTS

WO 02087152 A1 10/2002

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Teshome Hailu
(74) *Attorney, Agent, or Firm* — Meunier Carlin & Curfman LLC

(57) ABSTRACT

Methods and systems for protecting computer systems against intrusion. The disclosed techniques detect intrusions by jointly considering both cyber security events and physical security events. In some embodiments, a correlation subsystem receives information related to the computer system and its physical environment from various information sources in the cyber domain and in the physical domain. The correlation subsystem analyzes the information and identifies both cyber security events and physical security events. The correlation subsystem finds cyber security events and physical security events that are correlative with one another, and uses this correlation to detect intrusions.

19 Claims, 2 Drawing Sheets

(56) References Cited

U.S. PATENT DOCUMENTS

| | | |
|---|---|---|
| 2008/0209227 A1* | 8/2008 | Venkatesan et al. ......... 713/186 |
| 2008/0261192 A1 | 10/2008 | Huang et al. |
| 2008/0285464 A1 | 11/2008 | Katzir |
| 2009/0115570 A1* | 5/2009 | Cusack, Jr. .................... 340/5.2 |
| 2009/0119762 A1* | 5/2009 | Thomson et al. ................ 726/7 |
| 2011/0126111 A1* | 5/2011 | Gill et al. ..................... 715/736 |
| 2012/0084857 A1 | 4/2012 | Hubner et al. |
| 2012/0216243 A1* | 8/2012 | Gill et al. .......................... 726/1 |
| 2012/0255023 A1* | 10/2012 | Maor et al. ..................... 726/25 |

OTHER PUBLICATIONS

Rohde & Schwarz GmbH & Co. KG, "Accessnet-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, & Radiomonitoring Radiolocation, Jan. 2001, 16 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fox Replay BV, "FoxReplay Analyst," http//www.foxreplay.com, Revision 1.0, Nov. 2007, 5 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Smith, J.M., et al., "Integrating physical and computer access control system," Proceedings, Institute of Electrical and Electronics Engineers 1993 International Carnahan Conference on, Ottawa, Ontario, Canada, Oct. 13-15, 1993, IEEE, Oct. 12, 1994, pp. 176-179.

\* cited by examiner

SYSTEMS AND METHODS FOR COMBINED PHYSICAL AND CYBER DATA SECURITY

FIELD OF THE DISCLOSURE

The present disclosure relates generally to data security, and particularly to methods and systems for combining physical and cyber data protection.

BACKGROUND OF THE DISCLOSURE

Organizations such as financial institutions and critical infrastructure installations use a variety of security measures for protecting their premises and their computer systems against intrusion. Some intrusions are performed in the cyber domain, e.g., involve unauthorized access to the computer system by malicious software. Other intrusions are performed in the physical domain, e.g., involve unauthorized physical access to the organization premises or equipment.

SUMMARY OF THE DISCLOSURE

An embodiment that is described herein provides a method including receiving information from one or more sources. A cyber security event involving unauthorized access to a computer system by malicious software, and a physical security event involving unauthorized physical access to a physical vicinity of the computer system, are identified in the information. The cyber security event and the physical security event are correlated so as to detect an intrusion into the computer system.

In some embodiments, correlating the cyber security event and the physical security event includes correlating a first location at which the cyber security event occurred and a second location at which the physical security event occurred. Additionally or alternatively, correlating the cyber security event and the physical security event includes correlating a first identity of an individual who carried out the cyber security event and a second identity of the individual who carried out the physical security event.

Further additionally or alternatively, correlating the cyber security event and the physical security event includes setting a security access control rule based on the correlated cyber security event and physical security event. In an example embodiment, the method includes reconfiguring at least one of a cyber access control system and a physical access control system responsively to the security access control rule.

In a disclosed embodiment, correlating the cyber security event and the physical security event includes updating a characteristic behavior pattern of a user of the computer system based on the correlated cyber security event and physical security event. In an embodiment, correlating the cyber security event and the physical security event includes predicting a future occurrence of the intrusion. In another embodiment, correlating the cyber security event and the physical security event includes producing and outputting evidence regarding the intrusion based on the correlated cyber security event and physical security event.

In yet another embodiment, correlating the cyber security event and the physical security event includes adapting a correlation criterion based on the correlated cyber security event and physical security event. In still another embodiment, correlating the cyber security event and the physical security event includes comparing the correlated cyber security event and physical security event to a predefined threat scenario, and issuing an alert when the predefined threat scenario is met.

There is additionally provided, in accordance with an embodiment that is described herein, apparatus including a front-end unit and a correlation subsystem. The front-end unit is configured to receive information from one or more sources. The correlation subsystem is configured to identify in the information a cyber security event that involves unauthorized access to a computer system by malicious software, to identify in the information a physical security event that involves unauthorized physical access to a physical vicinity of the computer system, and to correlate the cyber security event and the physical security event so as to detect an intrusion into the computer system.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and systems for protecting computer systems against intrusion. The disclosed techniques detect intrusions by jointly considering both cyber security events (typically unauthorized access to the computer system by malicious software) and physical security events (typically physical access by an unauthorized individual to the vicinity of the computer system).

In some embodiments, a correlation subsystem receives information related to the computer system and its physical environment from various information sources in the cyber domain and in the physical domain. The correlation subsystem analyzes the information and identifies both cyber security events and physical security events. The correlation subsystem finds cyber security events and physical security events that are correlative with one another, and uses this correlation to detect intrusions.

By correlating cyber security events and physical security events, the disclosed techniques are highly effective in detecting intrusions and intrusion attempts. In many practical scenarios, such intrusions are undetectable when cyber and physical security are each considered separately.

Various examples of correlation criteria are described herein. Some correlation criteria relate to location, e.g., correlate cyber security events and physical security events relating to the same location. For example, unauthorized insertion of a removable memory device in a certain computer, which occurs shortly after an unauthorized entry into the area where that computer is located, together form a strong indication of an intrusion attempt.

Other correlation criteria are related to identity, e.g., correlate cyber security events and physical security events relating to the same individual. For example, if a certain employee logs-in to a computer or application that is not normally related to his line of work, and the same individual enters a room he is not allowed to enter, the two events could indicate an intrusion.

In some embodiments, the correlations and detected intrusions are used for adapting the correlation criteria, so as to improve the detection capability for future intrusions. In other embodiments, the correlations and detected intrusions are used for reconfiguring security systems in the cyber and/or physical domain, such as firewalls or physical access control systems.

System Description

Figure 1:
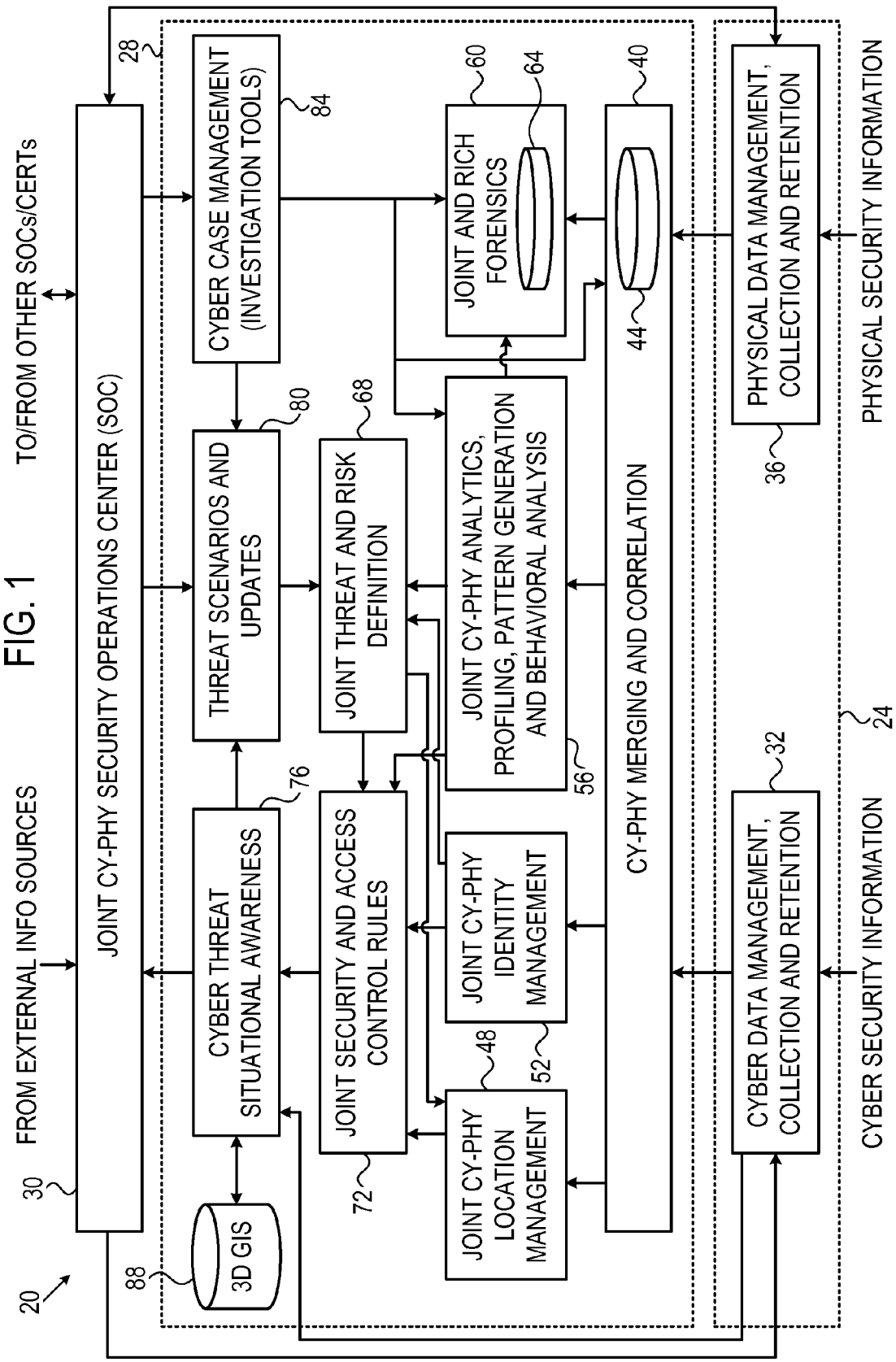
FIG. 1 is a block diagram that schematically illustrates a joint cyber and physical security system, in accordance with an embodiment of the present disclosure.

FIG. 1 is a block diagram that schematically illustrates a joint cyber and physical security system 20, in accordance with an embodiment of the present disclosure. System 20 can be used for protecting any suitable computer system (not shown in the figure), such as a computer system of a financial institution or critical infrastructure installation, against intrusion. Other organizations that may use a system of this sort are, for example, telecommunication organizations, electricity companies and other energy production organizations, as well as law enforcement agencies, security operations centers and emergency response teams.

System 20 detects and acts upon intrusions by merging and correlating the cyber domain ("CY") and the physical domain ("PHY") using techniques that are described in detail below. In the example of FIG. 1, system 20 can be roughly partitioned into a front-end 24 and a correlation subsystem 28. Each of these elements may comprise multiple hardware and/or software components and subsystems. Front-end 24 and subsystem 28 operate in conjunction with a joint CY-PHY Security Operations Center (SOC) 30.

Front-end 24 receives information related to the computer system and its physical environment from various sources. The front-end manages and retains this information, and provides it to correlation subsystem 28 for analysis. Correlation subsystem 28 analyzes the information so as to identify both cyber security events and physical security events. The correlation subsystem identifies cyber security events and physical security events that are correlative with one another, and uses this correlation to identify potential intrusions.

In the present context, a cyber security event comprises any event that involves unauthorized access to the communication system by malicious software (malware). A physical security event comprises any event that involves unauthorized physical access to the physical vicinity of the computer system.

Cyber security events may be caused, for example, by viruses, worms, Trojan horses or any other suitable type of malware. The malware may attempt, for example, to retrieve data from the computer system, to corrupt, modify or destroy data, to degrade the performance of the computer system or to make unauthorized use of the processing power or other resources of the computer system.

Physical security events may comprise, for example, unauthorized entry into a room or other area, crossing of the perimeter of an installation where the computer system is located, or even deviation from the normal location or activity pattern of a certain individual. Another form of physical security event is an attempt to obtain information regarding the computer system by phone, e.g., by making contact with employees or call center representatives for the purpose of obtaining access credentials to the computer system.

As can be seen from the above examples, cyber security events and physical security events may be carried out either by external parties or by internal parties such as employees or visitors, either knowingly or unknowingly.

In the present example, front-end 24 comprises a cyber data management unit 32, and a physical data management unit 36. Units 32 and 36 collect, manage and retain the information received from sources in the cyber and physical domains, respectively. In an example embodiment, unit 32 is located in a Cyber Security Operations Center (CSOC) of the organization, and unit 36 is located in a Physical Security Operations Center (PSOC) of the organization, so as to simplify the interfacing with the appropriate information sources.

In an embodiment, unit 32 supports feedback functionality for the cyber-domain systems, e.g., remote control, re-configuration and/or black-list updating of cyber-domain systems such as firewalls and intrusion detection and prevention systems. In an embodiment, unit 36 supports feedback functionality for the physical-domain systems, e.g., remote control, re-configuration and/or black-list updating of physical-domain systems such as access control systems. Units 32 and 36 may also provide unmerged alerts (i.e., indications of security events that are not correlated with security events in the opposite domain) to correlation subsystem 28.

Front-end 24 and correlation subsystem 28 may receive and analyze information related to cyber security events from various sources, for example by receiving and analyzing communication traffic, moves or actions (e.g., Internet and telephony traffic and transactions). The communication traffic may comprise external traffic that enters or leaves the organization computer system or internal traffic within the organization computer system. External cyber security events may be obtained, for example, by network protocol analysis (e.g., HTTP, HTTPS, FTP, FTPS, DNS or P2P) and extraction of metadata, analysis of authentication data, global routing information (e.g., BGP, Netflows, RIR or Blacklists), global IP geo-location, watchlists, brands, honeynets, malware and social network (e.g., Facebook or Twitter) metadata.

Other sources of information related to cyber security events, typically internal to the computer system, may comprise, for example, logical awareness logs of the organization computer infrastructure, organization applications, operating systems, Supervisory Control and Data Acquisition (SCADA) systems, Internet applications (e.g., online transactions, human resources systems, wire systems or Websites), Intranet portals, Personal Computers and USB storage devices.

Information related to cyber security events may also be obtained from communication and telephony system logs (e.g., voice response units, voice-over-IP phones and exchanges, voice mail or cellular phones), as well as access control systems such as identity management, Authentication, Authorization and Accounting (AAA) servers, firewalls or credentials management systems. Additionally or alternatively, unit 32 may receive information related to cyber security events from any other suitable source.

In some embodiments, unit 32 carries out a cyber monitoring threat detection process, which identifies previously-unknown cyber security threats. The process may achieve high performance by analysis of hundreds of unique characteristics from multiple network flows. The process may, for example, characterize malware command and control channels within network traffic and detect anomalies through network monitoring. For example, applications may be monitored on a per-user basis. The user database (e.g. active directory, LDAP, RADIUS or other external database) may be be coupled with the IP address of the flow that uses the application in question.

System 20 may then enforce these flows based on the type of application or application group and user or user group. This process may additionally scan applications flow in order to identify whether the flow contains malicious code or other type of undesired communication such as backchannels or bots.

Unit 36 may receive information related to physical security events from various sources. Physical security events may be roughly divided into external events that originate from outside the computer system facilities, premises or borders, and internal events that originate from within the computer system facilities, premises or borders.

Information sources for internal physical security events may comprise, for example, physical awareness logs (e.g., mobile or fixed workforce management systems, desktop analytics or work attendance and shift management systems), surveillance systems (e.g., closed-circuit television—CCTV and video analytics), physical geo-location (e.g., RF-ID tags, mobile phones, fleet management data) and physical access control systems (e.g., badge-based systems, License Plate Recognition—LPR, face recognition, biometrics or speech analytics), and/or any other suitable event.

Information sources for external physical security events may comprise, for example, CCTV surveillance at entrances or perimeter of the organization premises, LPR-based access control, telephony and Internet calls to the organization call center, and/or any other suitable event.

In some embodiments, correlation subsystem 28 comprises a CY-PHY correlation unit 40 that merges and correlates the information collected via front-end 24 from the various cyber-related and physical-related information sources. Unit 40 comprises a merged data retention database 44 for storing merged events and related information. Correlation unit 40 typically merges and analyzes the information so as to identify cyber security events and physical security events that are correlative with one another.

Correlation unit 40 may identify and correlate cyber security events and physical security events in accordance with various criteria. Two example types of correlation criteria, namely location-based correlation and identity-based correlation, are described below. Additionally or alternatively, however, unit 40 may identify and correlate cyber security events and physical security events in accordance with any other suitable criterion.

When using a location-based correlation criterion, unit 40 establishes a correlation between a cyber security event and a physical security event if both events relate to the same physical or geographical location. Security events may be related to locations in various manners. Consider, for example, an employee who is physically located in France and attempts to access a computer in the computer system that is located in Germany. If no past patterns of such a behavior exist, this event may well be considered a cyber security event.

As another example, consider an unauthorized attempt to access a Wireless Local Area Network (WLAN) Access Point (AP) in a certain location—a cyber security event. The same location (either within the organization premises or nearby) may be monitored by a CCTV system, LPR system, face recognition system or other access control system. The access control system can be triggered to monitor the area of the WLAN AP in question, i.e., to try and capture an on-going physical security event correlative to the cyber security event.

In some embodiments, unit 40 determines the location associated with a cyber security event using IP geo-location, i.e., determining the location of an IP address involved in the cyber security event. Unit 40 may determine the location related to a physical security event using, for example, cellular phone location, GPS-based location, location of RFID tags, location of Bluetooth devices, or access control systems such as badge-based or biometrics-based systems. Unit 40 may correlate the locations associated with the cyber and physical security events using these location sources. If a certain cyber security event and a certain physical security event occur in the same location in the same time frame, they may be regarded as correlated.

When using an identity-based correlation criterion, unit 40 establishes a correlation between a cyber security event and a physical security event if both events relate to the same individual. If a cyber security event and a physical security event relate to the same individual, they may be regarded as correlated.

The identity of an individual involved in a cyber security event may be obtained, for example, from login credentials. The identity of an individual involved in a physical security event may be obtained, for example, from smartcard systems, biometric access control systems (e.g., iris, voiceprint or fingerprint identification systems), user keystroke pattern analysis, desktop and process analytics (DPA). Joint management of identities in the cyber and physical domains enables high-quality authentication and prevents synchronization problems across different parts of the computer system. (In a non-synchronized computer system, for example, delays in synchronizing identity-related information, such as an employee's termination of employment, may create potential security vulnerability.)

In some embodiments, correlation subsystem 28 comprises a joint CY-PHY location management unit 48 and a joint CY-PHY identity management unit 52. Unit 48 manages the physical locations and cyber-domain locations of individuals and vehicles based on the information collected by front-end 24, for example in accordance with the location-based correlation criteria explained above. The joint CY-PHY management of locations enables better access control, better situational awareness and rich forensics. Moreover, joint CY-PHY management of locations enables subsystem 28 to identify which elements of the computer system are accessed from what locations, by whom and when, as well as other settings of joint location-based alerts, logs and forensics.

Unit 52 manages the physical-domain identities and cyber-domain identities of individuals based on the information collected by front-end 24, for example in accordance with the identity-based correlation criteria explained above. Joint CY-PHY management of individual identities in the organization reduces the potential of identity theft and creates better identity control and stronger authentication of customers, employees and vendors. Moreover, joint CY-PHY management of identities enables subsystem 28 to identify which elements of the computer system are accessed from what locations, by whom and when, as well as other settings of joint location-based alerts, logs and forensics.

The correlation subsystem further comprises a joint CY-PHY analytics, profiling, pattern generation and behavioral analysis unit 56. Unit 56 uses the information collected by front-end 24 to perform various joint CY-PHY analytics functions. For example, unit 56 may generate and create behavioral patterns and activity profiles of users, employees, applications, computers, IP addresses, URLs, processes and locations across the organization's systems, networks, physical security logs and external cyber-threat information.

Unit 56 may identify previously undetectable intrusions based on this analysis. Unit 56 may detect anomalies and thus create better situational awareness. For example, correlated activity patterns in the cyber and physical domains can better detect unusual malicious activity. Based on the analyzed information, unit 56 may predict future vulnerabilities and security events. Additionally or alternatively, unit 56 may create high-quality investigation and evidence material, by enabling merged and rich forensic of cyber incidents.

Correlation subsystem 40 comprises a forensics unit 60, which provides rich evidence and intelligence investigation material related to cyber-crime events. The evidence material is correlated across the cyber and physical domains. Typically, for a given cyber security event identified as a cyber crime, unit 60 obtains information such as how the crime was done, who committed the crime, who was involved, when and how many times and at what frequency the crime was committed, from where (a location inside and/or outside the organization premises) the crime was committed, detailed tracing and way-points of actions taken by the criminal(s) after the infiltration, which users and computer system elements are affected by the crime (both inside and outside the organization), and/or an assessment of the damage.

The sources processed by unit 56 may comprise, for example, the outputs of units 32 and 36, and of unit 56. Unit 60 comprises a database 64 for storing the rich evidence and investigation material.

In some embodiments, correlation subsystem 28 comprises a joint security and access control rules unit 72. Unit 72 creates and updated joint access control rules for the various (cyber and physical) access control systems of the organization, for example for firewalls and intrusion prevention systems of the computer system, and/or for badge-based or biometric physical access control systems of the organization.

Unit 72 typically defines and updates the access control rules based on the location-based and identity-based outputs of units 48 and 52, based on the joint analysis, profiles and patterns provided by unit 56, and based on joint threat and risk definitions 68. As such, unit 72 defines and updates the access control rules jointly based on physical and cyber security events. In addition to configuring access control systems, unit 72 uses the access control rules to issue alerts when one or more of the rules are violated.

This sort of joint CY and PHY access control improves the overall access control of the organization, for example prevents attackers from gaining physical access to an organization computer or logical system. In an embodiment, this joint access control controls and tracks any device that is connected to the network to ensure that it is not turned into an attack or espionage tool.

In some embodiments, subsystem 28 comprises a cyber threat situational awareness unit 76, a three-dimensional (3D) Geographic Information System (GIS) database 88, a threat scenario and updates unit 80 and a cyber case management unit 84.

Cyber case management unit 84 provides a set of Graphical User Interface (GUI) tools for investigation purposes. The tools are based on, for example, ticketing information, rich forensics and correlated data retention, profiling (patterns) and analytics. In other words, the tools offered by unit 84 typically use the outputs of units 40, 56 and 60. Unit 84 typically lays out the locations of the cyber security events on a 3D map, as available.

Threat scenario and updates unit 80 provides end-users tools for defining and updating system 20 with organization risks and threat scenarios related to cyber crimes (typically sequences of events, both in the physical domain and in the cyber domain). Using this information, unit 80 may also predict the occurrence or development of an imminent cyber security event, even if the event did not yet begin or is in its early stages. This function is sometimes referred to as "quasi-prediction," and enables fast reaction to security events.

In some embodiments, one or more of the rules of unit 72 refer to the threat scenarios input to unit 80. In other words, unit 72 may compare the cyber and physical security events, and issue an alert if the actual sequence of events matches one or more of the threat scenarios.

The process conducted by unit 80 may use, for example, the outputs of case management unit 84, situational awareness alerts from unit 76, external information obtained from information sharing with other Security Operations Centers (SOCs) on the national and/or international level (as will be explained below), and/or other external, independent information originating from publications, law enforcement sources, security vendors and underground forums, for example.

Cyber threat situational awareness unit 76 typically visualizes (e.g., using text, graphics, maps and/or video) the rich alerts produced by unit 72. For example, for a joint CY-PHY alert that is displayed using video and location, unit 76 may indicate the location of the joint security event on a 3D map (using GIS database 88), present video footage of the event (e.g., from CCTV surveillance), display textual descriptions and available details of the event and its impact, and/or present any other suitable information.

3D GIS database 88 typically comprises a 3D map and a 3D visualization model of the organization premises. The 3D map and model typically cover both indoor and outdoor areas of the premises, in order to enable visualization of locations and zones under threat (as part of the situational awareness rich alerts), to navigate inside the 3D model in conjunction with CCTV surveillance, and/or to enable rich investigation and forensics in case of cyber event investigation.

As noted above, subsystem 28 may comprise mechanisms for remote control, black list update and parameter re-configuration of both CY and PHY access control and protection systems, in order to better confront emerging and future threats according to the risk analysis and quasi-prediction results.

In some embodiments, SOC 30 exchanges and shares information with external entities, such as other national or international SOCs, Law Enforcement Agencies (LEAs) and/or Cyber Emergency Response Teams (CERTs). The exchanged information may comprise, for example, threats, alerts and/or any other suitable relevant information (e.g., fraudsters' voiceprints). In some embodiments, SOC 30 receives information from external information sources such as publications, law enforcement sources, security vendors, underground forums, among others. Any external information received in this manner may be used by subsystem 28 to enhance the rules and scenarios and to better identify or predict security intrusions. The type, level and frequency of information sharing may be configurable.

The various units of correlation subsystem 28 may be viewed as being arranged in hierarchical layers: Layer I comprises unit 40, layer II comprises units 48, 52, 56 and 60, layer III comprises units 68 and 72, and layer IV comprises units 76, 80, 84 and 88. The units in the various layers interact with one another, for example so as to identify security events and adapt access control rules, in a closed-loop manner.

The system configuration of system 20 shown in FIG. 1 is an example configuration, which is chosen purely for the sake of conceptual clarity. In alternative embodiments, any other suitable system configuration can also be used. The elements of system 20 may be implemented in hardware, in software, or using a combination of hardware and software elements. In some embodiments, certain functions of system 20 can be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Joint Cyber and Physical Security Method Description

Figure 2:
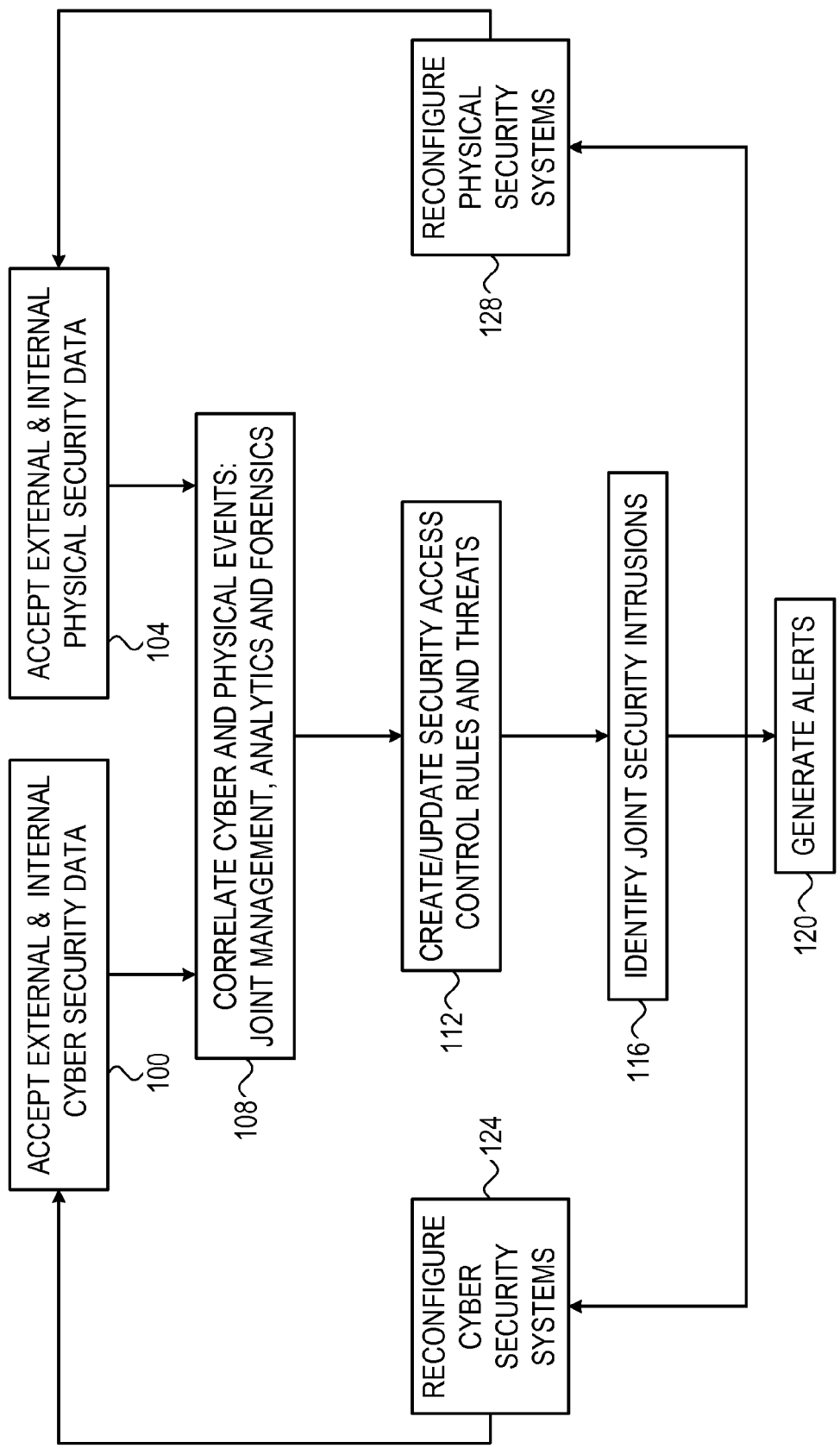
FIG. 2 is a flow chart that schematically illustrates a method for joint cyber and physical security, in accordance with an embodiment of the present disclosure.

FIG. 2 is a flow chart that schematically illustrates a method for joint cyber and physical security, in accordance with an embodiment of the present disclosure. The method begins with front-end 24 of system 20 receiving cyber security information, at a cyber input step 100, and physical security information, at a physical input step 104.

Correlation subsystem 28 of system 20 correlates the two types of information, at a correlation step 108. Based on this correlation, subsystem 28 carries out, for example, joint cyber-domain and physical-domain location management, identity management, as well as analytics and forensics.

Unit 72 of subsystem 28 creates and updates security access control rules and threats based on the joint management, at a rule generation step 112. The rules apply to both cyber access control systems (e.g., firewalls) and physical access control systems (e.g., entry verification systems at facility gates).

When a certain security rule is violated, e.g., upon occurrence of correlated cyber security event and physical security event, unit 72 declares a possible intrusion, at an intrusion detection step 116. Typically, unit 72 issues an appropriate alert indicating the intrusion, at an alerting step 120. The alert is provided via unit 76 to SOC 30.

In some embodiments, upon updating or creating a security access control rule, subsystem 20 reconfigures the cyber security systems of the computer system with the updated rule, at a cyber system updating step 124, and reconfigures the physical security systems of the organization with the updated rule, at a physical system updating step 128.

Although the embodiments described herein mainly address detection of intrusions into computer systems, the principles of the present disclosure can also be used in other applications that involve the physical domain and the cyber domain, such as for fraud detection in banks or other financial institutions, or for detection of ethical phishing in contact centers.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method comprising:
   receiving, by an electronic front-end unit, communication traffic of a computer system from one or more sources;
   identifying, by an electronic correlation unit, in the received communication traffic a cyber security event and a physical security event, wherein the cyber security event is an occurrence of unauthorized access to the computer system through the use of malicious software, and wherein the physical security event is an occurrence of unauthorized physical entry into a location where the computer system is physically located; and
   identifying, by the electronic correlation unit, an intrusion by correlating the cyber security event and the physical security event by using location-based correlation and identity-based correlation.

2. The method according to claim 1, wherein the location-based correlation comprises correlating a first location at which the cyber security event occurred and a second location at which the physical security event occurred.

3. The method according to claim 1, wherein the identity-based correlation comprises correlating a first identity of an individual who carried out the cyber security event and a second identity of the individual who carried out the physical security event.

4. The method according to claim 1, further comprising configuring a security access control rule based on the correlated cyber security event and physical security event.

5. The method according to claim 4, further comprising reconfiguring at least one of a cyber access control system and a physical access control system responsively to the security access control rule.

6. The method according to claim 1, further comprising updating a characteristic behavior pattern of a user of the computer system based on the correlated cyber security event and physical security event.

7. The method according to claim 1, further comprising adapting a correlation criterion based on the correlated first event and second event.

8. The method according to claim 1, further comprising comparing the correlated cyber security event and physical security event to a predefined threat scenario, and issuing an alert when the predefined threat scenario is met.

9. Apparatus, comprising:
   a front-end unit, which is configured to receive communication traffic of a computer system from one or more sources; and
   a correlation subsystem, which is configured to:
      identify in the received communication traffic a cyber security event and a physical security event, wherein the cyber security event is an occurrence of unauthorized access to the computer system through the use of malicious software, and wherein the physical security event is an occurrence of unauthorized physical entry into a location where the computer system is physically located; and identify an intrusion by correlating the cyber security event and the physical security event using location-based correlation and identity-based correlation.

10. The apparatus according to claim 9, wherein the location-based correlation comprises correlating a first location at which the cyber security event occurred and a second location at which the physical security event occurred.

11. The apparatus according to claim 9, wherein the identity-based correlation comprises correlating a first identity of an individual who carried out the cyber security event and a second identity of the individual who carried out the physical security event.

12. The apparatus according to claim 9, wherein the correlation subsystem is further configured to set a security access control rule based on the correlated cyber security event and physical security event.

13. The apparatus according to claim 12, wherein the correlation subsystem is further configured to reconfigure at least one of a cyber access control system and a physical access control system responsively to the security access control rule.

14. The apparatus according to claim 9, wherein the correlation subsystem is further configured to update a characteristic behavior pattern of a user of the computer system based on the correlated cyber security event and physical security event.

15. The apparatus according to claim 9, wherein the correlation subsystem is further configured to adapt a correlation criterion based on the correlated cyber security event and physical security event.

16. The apparatus according to claim 9, wherein the correlation subsystem is further configured to compare the correlated cyber security event and physical security event to a predefined threat scenario, and to issue an alert when the predefined threat scenario is met.

17. A non-transitory computer readable medium having stored thereon instructs that, when executed by a processor, direct the processor to:
  receive communication traffic of a computer system from one or more sources;
  identify in the received communication traffic a cyber security event and a physical security event, wherein the cyber security event is an occurrence of unauthorized access to the computer system through the use of malicious software, and wherein the physical security event is an occurrence of unauthorized physical entry into a location where the computer system is physically located; and
  identify an intrusion by correlating the cyber security event and the physical security event using location-based correlation and identity-based correlation.

18. The non-transitory computer readable medium of claim 17, further having stored thereon instructs that, when executed by a processor, direct the processor to configure a security access control rule based on the correlated cyber security event and physical security event.

19. The non-transitory computer readable medium of claim 18, further having stored thereon instructs that, when executed by a processor, direct the processor to reconfigure at least one of a cyber access control system and a physical access control system responsively to the security access control rule.

* * * * *